March 16, 1965 W. F. MITCHELL 3,173,445
SAFETY VALVE MEANS FOR PROTECTING AGAINST THE LOSS OF FLUID
IN A PRESSURIZABLE FLUID SYSTEM
Filed July 11, 1962 2 Sheets-Sheet 1

INVENTOR.
Wallace F. Mitchell
BY
Fidler, Beardsley & Bradley
Att'ys.

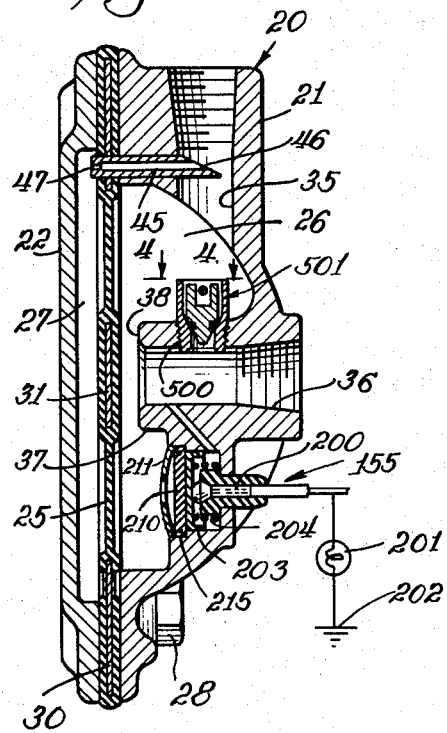
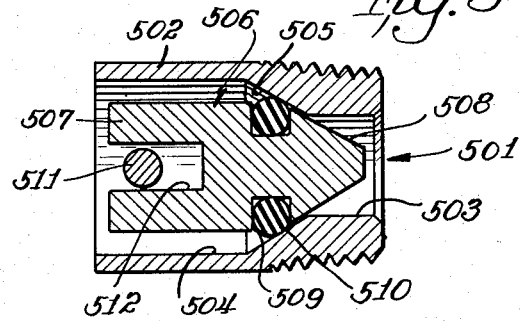
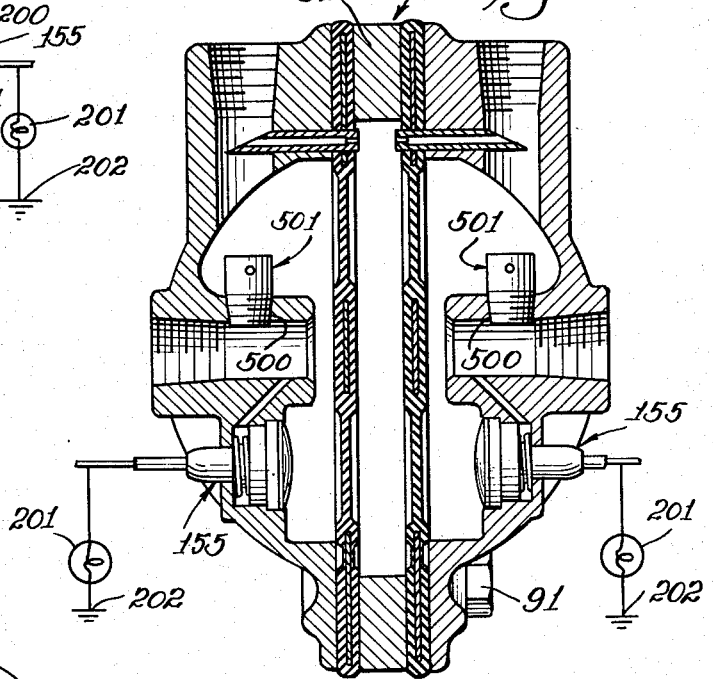
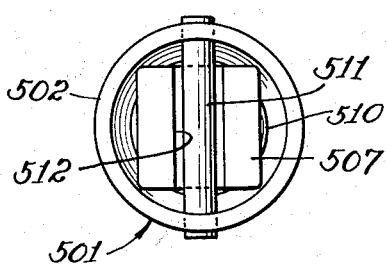
INVENTOR.
Wallace F. Mitchell

United States Patent Office 3,173,445
Patented Mar. 16, 1965

3,173,445
SAFETY VALVE MEANS FOR PROTECTING AGAINST THE LOSS OF FLUID IN A PRESSURIZABLE FLUID SYSTEM
Wallace F. Mitchell, Arlington Heights, Ill., assignor to Guenther-Mitchell Co., Park Ridge, Ill., a partnership
Filed July 11, 1962, Ser. No. 209,006
3 Claims. (Cl. 137—493.7)

This invention relates to safety valves and more particularly to a safety valve for use in compressed air control systems wherein one or more air actuated devices are energized from a source of pressurized air, such safety valve serving to protect against loss of air pressure in the event of rupture of an air line connected to the device or devices or failure of one or more of the devices.

The invention is especially well adapted for use in connection with air brake systems such as used on trucks and particularly trailer trucks or semi-trailer trucks and is disclosed in connection therewith but is not limited thereto. In such systems the brake or brakes are connected to a source of air under pressure through piping and if there is a rupture in the line or failure in the brake cylinder or booster, or a slow leak, air escapes with the result that the air brake or brakes fail to operate because of the loss of pressure within the system.

In air brake systems of the type to which the present invention relates, all of the brakes are connected in parallel to the source of compressed air, and thus if there is a rupture in the line or failure in the brake cylinder or booster the air pressure is rapidly dissipated with the result that none of the brakes can be operated.

In accordance with the present invention a safety valve is provided whereby upon a rupture of the air line or failure in the brake cylinder or booster, or other failure such as a slow leak the line is closed to halt the flow of air to the point of rupture so that the air within the system is retained and available for actuating any brakes connected to the system at portions other than those in which the failure occurs. For example, where there are two brakes on a single axle and lines connected to each of each brakes and a rupture occurs in the line leading to one of the brakes, the valve of the present invention cuts off the flow of air to the line in which the rupture occurs whereby the other line remains operative. In a like manner in a system where there are two sets of brakes on two axles a rupture of the air line leading to two of the brakes on a single axle will not cause loss of air in the system as the valve of the present invention will shut off the air to the two brakes and thus maintain the pressure in the system.

I have disclosed in my copending application Serial No. 173,007, filed February 13, 1962, a safety valve having a flexible diaphragm for cutting off the flow of air from the system whenever there is a failure in the brake cylinder or booster or in the line leading thereto. In such safety valve the diaphragm is normally disposed opposite and spaced from the outlet from the valve and divides the valve chamber into an air flow chamber and a compensating chamber, the latter being connected to the valve inlet by a restricted passage whereby air flows more slowly into the compensating chamber than it flows through the air flow chamber when braking pressure is applied. Thus, the diaphragm is moved further away from the outlet by the air pressure upon the initial application of braking pressure to allow increased flow of air through the air flow chamber but returns to normal position after the initial air flow. This movement of the diaphragm results from the fact that due to the restricted opening into the compensating chamber air cannot flow into the compensating chamber as fast as it flows into the air flow chamber. Consequently, a period of time is required for the air pressure to equalize on both faces of the diaphragm and for the diaphragm to reassume its normal position. When braking pressure is released, the diaphragm is forced away from the outlet to allow increased outflow of air through the valve whereafter the diaphragm returns to normal position.

It has been found that in some applications of my aforesaid safety valve the diaphragm does not move away from the outlet fast enough to allow rapid release of the brakes but remains substantially in normal position for a short period and thus impedes rapid flow of air in reverse direction through the valve. This is due to the fact that when air flows into the valve through the outlet, the diaphragm can only be moved further away from the outlet by forcing air out of the compensating chamber. Because of the restricted opening into the compensating chamber this takes an appreciable period of time, thus the brake may not be released as rapidly as desired.

An object of the present invention is to provide a new and improved safety valve for a compressed air control system.

Another object is to proivde a safety valve for a compressed air control system which is effective to cut off flow of air from the system upon the failure of the system beyond the valve and which permits relatively unimpeded flow of air through the valve except when there is a failure in the system beyond the valve.

Another object is to provide a safety valve for a compressed air control system, which valve has a diaphragm disposed opposite the outlet to the valve casing adapted to move into closing relation with the outlet to cut off the flow of air through the valve casing when a leak occurs in the line beyond the valve, which valve permits a freer and faster flow of air therethrough in a reverse direction when the air pressure on the system is released than in a forward direction when the air is applied to actuate the system.

Another object is to provide a safety valve for an air brake system which is adapted to cut off the flow of air to the brake actuating means when a leak occurs between the valve and the brake actuating means and which valve permits a freer flow of air therethrough when braking pressure is released than when it is applied.

Other objects and advantages of the invention will appear from the following description taken in connection with the appended drawings, wherein:

FIG. 3 is a view of a section taken along line 3—3 of FIG. 2;

FIG. 4 is a view of a section taken along line 4—4 of FIG. 3;

FIG. 5 is a view of a section taken along line 5—5 of FIG. 4; and

FIG. 6 is a view of a section taken through a second form of valve according to the invention.

The valve of the present invention is suitable for use in many different types of compressed air control systems but is particularly well adapted for use in a braking system wherein the valve controls the flow of air to two brake control cylinders controlling brakes located on a single axle and the invention will be illustrated and described in connection with such embodiment. However, the invention provides not only a double valve especially well adapted for use with two brakes but a single valve which may be used in connection with one brake, or one line connected to two or more brakes and is also disclosed in such embodiment.

In accordance with the invention, the safety valve includes a casing defining a chamber having an inlet and and outlet, a diaphragm being provided which divides the chamber into an air flow compartment and a compensating compartment. The inlet, air flow compartment and outlet form an air flow passage through the casing. A seat is provided around the outlet from which the diaphragm is normally spaced and against which the diaphragm is adapted to seat to close off air flow through the valve when the pressure in the compensating compartment is sufficiently greater than the pressure in the air flow compartment. A reduced "sensing" passage connects the inlet with the compensating compartment whereby upon an initial flow of air through the air flow compartment under operating, or releasing pressure, the pressure in the air flow compartment is greater than in the compensating compartment and the diaphragm is moved away from the seat but if such flow continues beyond a predetermined period (as when there is a break or major leak in the line) the pressure builds up in the compensating chamber and the diaphragm is caused to move to closing position. Also, if there is a slow leak in the line beyond the valve, the continuation of the air passing through the inlet 35 and past the outer ends of the tubes 45a or 45b will cause enough difference in pressures in the compartments to cause the diaphragm to close.

Figure 1:
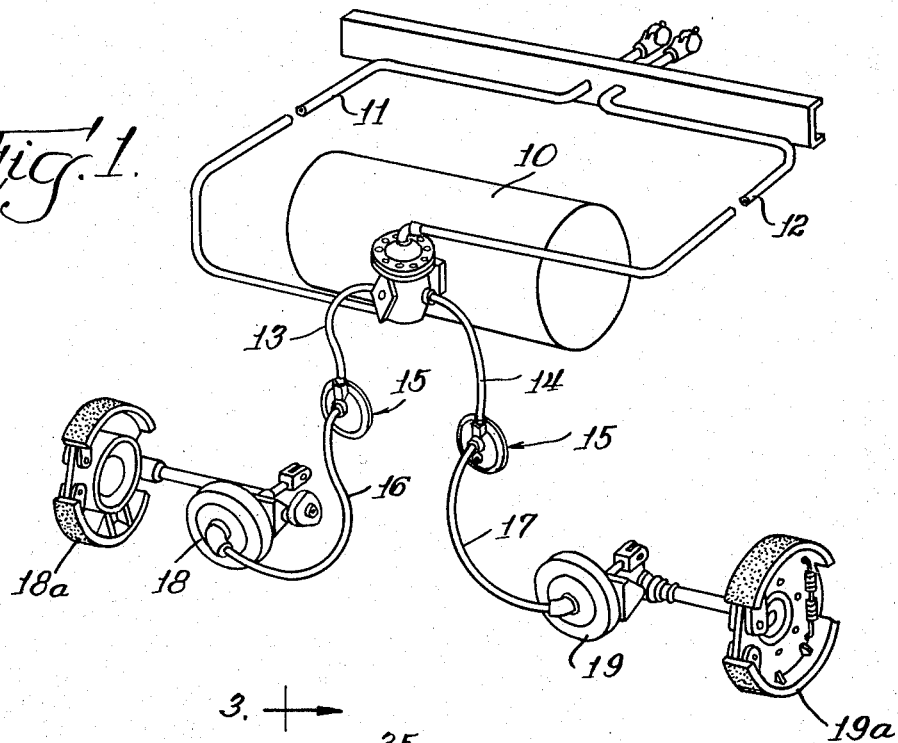
FIG. 1 is a schematic perspective view of an air brake system incorporating one embodiment of the present invention.
Figure 2:
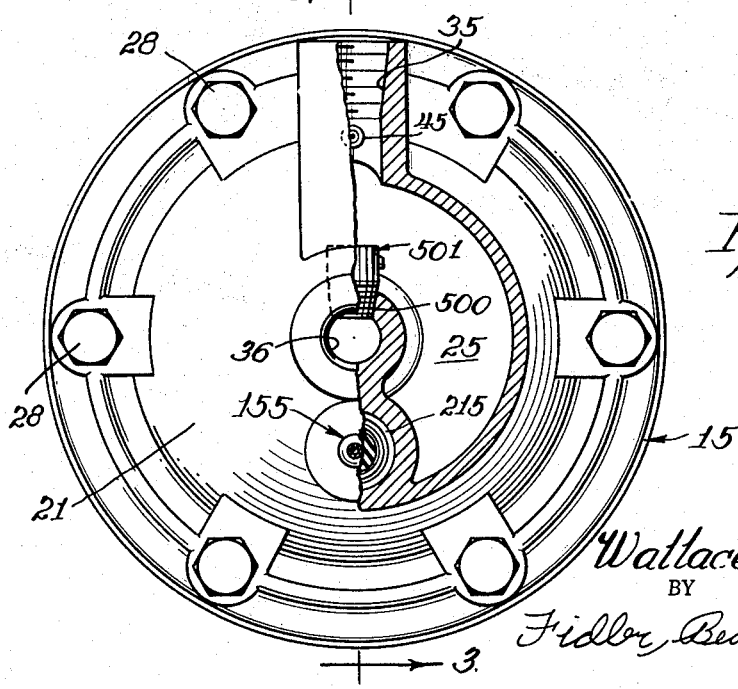
FIG. 2 is a plan view of one form of valve in accordance with the invention, with parts broken away.

One illustrative embodiment of an air brake system in which the present invention may be used is shown in FIG. 1 of the drawings. The structure includes a reservoir 10 containing compressed air to which control lines 11 and 12 are connected and which lead from suitable control means (not shown) for controlling the application and release of the brakes. Suitable compressor means (not shown) are provided for maintaining the pressure of air within the reservoir 10. Connected to the reservoir 10 is a relay valve 9 of conventional construction to which is connected conduits 13 and 14 leading to the safety valve assembly of the present invention, which may include two separate valves 15 such as shown in FIGS. 2 to 4 or a double valve such as shown in FIG. 5. Conduits 16 and 17 are connected to the safety valves 15 and lead to air brake control cylinders 18 and 19 which may be of conventional construction and which are connected to brakes 18a and 19a respectively.

The function of the safety valves 15 is to permit the flow of air from the line 13 to the line 16 and from the line 14 to the line 17 when the air brakes are working properly and to prevent the flow of air to either of the lines 16 or 17 whenever there is a rupture or leak in such line or the connected brake cylinder fails or there is a slow leak in the system beyond the valve. For example, if the line 16 should rupture or if the associated brake cylinder 18 should fail and permit free escape of air, the safety valve 15 will function to prevent the loss of compressed air from the line 13. Thus, the escape of air and consequent reduction of air pressure in the system will be prevented and the remaining brakes, for example, the air brake 17, may still be operated.

The safety valve of the present invention is particularly well adapted for use in controlling the flow of air to two air brake control cylinders but, as will be understood, it may be used for controlling the flow of air to a single brake cylinder or to a single set of air cylinders connected to a single pipe or it may be used for controlling the flow of air to two air cylinders separately or two sets of air cylinders separately.

The valve of the present invention comprises a casing 20 (FIG. 3) preferably formed by two casing sections 21 and 22, which are suitably secured together as by bolts 28 to define a chamber 23.

Secured between the casing sections 21 and 22 is a diaphragm 25, hereinafter more fully described and which divides the chamber 23 into two compartments, namely an air flow compartment 26 and a compensating compartment 27. The diaphragm 25 is clamped at its periphery between the two casing sections 21, 22 respectively.

The diaphragm is formed of flexible, resilient material such as rubber or a rubber-like plastic, as for example a synthetic rubber, which retains its flexibility and resiliency over a long period of use and remains impervious to the flow of air therethrough and to the deleterious effects of moisture and oil which may be entrained in the air passing through the valve.

At its peripheral portion each diaphragm has imbedded therein and bonded thereto a stiffening element 30 formed of rigid material, preferably metal, of generally annular shape which is of such width as to extend over substantially the entire area between the adjacent casing sections 21 and 22 and inwardly thereof and into the chamber 23 to a sufficient extent to prevent undesired displacement of the diaphragm. In other words, the reinforcing ring 30 insures that only the portion of the diaphragm inwardly of the clamped portion is displaced during operation into a bowed form and that the diaphragm does not "warp" or become displaced in an irregular manner such as to prevent the diaphragm from closing against the seat hereinafter described. The diaphragm is reinforced and stiffened in its central portion by a reinforcing disc 31 formed of rigid material, preferably metal, which is imbedded in the diaphragm. The reinforced portion of the diaphragm is of an area which is equal to or slightly greater than the area of the seat hereinafter described and with which the diaphragm cooperates.

Formed in the casing member 21 is an inlet opening or passage 35, which may be threaded for connection of a pipe or conduit such as the pipes 13 which opens into the corresponding compartments 26. The inlet opening preferably opens into the compartment 26 peripherally thereof, but this not essential and the inlet opening may be provided at another portion of the casing.

An outlet opening or passage 36 leads from the compartment 26 and is provided in the casing member 21 at the central portion thereof and is aligned with the axis of the casing. The outlet opening 36 is formed in a boss 37 which extends into the compartment 26 and into close proximity with the diaphragm 25. The inner end of the boss 37 serves as a seat 38, against which the central, reinforced portion of the diaphragm is adapted to seat when the diaphragm is displaced to thereby close the outlet and prevent the passage of air from the compartment. The arrangement is such that the central portion of the diaphragm is disposed opposite the corresponding seat and is normally spaced therefrom. In its normal position the diaphragm while being spaced from its seat sufficiently to allow air to flow through the outlet, is nevertheless sufficiently close so that only a slight outward movement (that is, movement toward the seat of the diaphragm) is sufficient to close the outlet.

Communication between the inlets 35 and the compensating chamber 27 is provided by a tube 45 having one end projecting into the inlet and formed with an opening 46 which is inclined toward the inlet end of the corresponding inlet, as shown. The tube 45 is secured as by a force fit in its casing section 21 and extends through the corresponding diaphragm and stiffening element and into the intermediate chamber 27 adjacent at the peripheral portion thereof. The inner end of the tube 45 is closed and adjacent the closed end an orifice 47 is provided which opens into the compensating chamber 27 so that there is communication between the inlet 35 and the intermediate chamber 27. The diameter of the tube and of the orifice 47 is such as to provide only restricted communication between the inlet 35 and the chamber 27 as hereinafter explained.

Means are provided in the casing for giving an alarm or signal if the line leading from the outlet should break when the brakes are being applied or if the brakes are applied when the line is broken. The arrangement is such that the alarm or signal is given at any time that the pressure in the outlet 36 is substantially lower than the pressure in the compartment 26.

Briefly, the alarm includes a switch 155 having a fixed contact 200 connected in a circuit with a signal lamp 201 and battery 202. A movable contact 203 is slidable in a socket 215 in the casing member 152 and normally urged out of the contact with the contact 200 by a spring 204, the movable contact member 203 having bearing contact with the casing member 152 which may be grounded (not shown). Disposed over the movable contact 203 is a flexible diaphragm 210, which is retained by a washer 211 secured in the casing over the diaphragm 210. An air passage 211 connects the outlet 36 with the socket 204 whereby when the pressure in the air flow compartment 26 exceeds the pressure in the outlet passage 36, the diaphragm 210 is depressed to move the movable contact 203 into contact with the fixed contact 200, and thus close the alarm circuit to energize the alarm. Thus it will be seen that it may be that when there is pressure in the air flow compartment and when the corresponding diaphragm is in closed position the alarm will be energized.

In use, the casing 20 is connected to one of the inlet lines 13 which communicates respectively with the inlets 35 and is connected to the lines 16 which communicate with the outlet 36. When the relay 9 is inactive and no air pressure is applied to the valve 15, the diaphragm 25 assumes its normal position as shown in FIG. 3 in which position it is displaced slightly from the seats 35. When the brake control means (not shown) is actuated, thus actuating the relay 9 and admitting air from the cylinder 10 to the casing 20 air flows rapidly under line pressure into the compartment 26. Owing to the fact that there is only atmospheric pressure in the chamber 27, the diaphragm 25 is displaced inwardly which inward movement (that is, away from its seat) is halted by engagement with the casing section 22.

The restricted passage provided by the tube 45 and the orifice 46 prevents the rapid entry of air into the compartment 27 and thus there is no substantial opposition to the inward displacement of the diaphragm 25. The movement of the central portion of the diaphragm 25 inwardly away from its seat 38 provides a wide space between the central portion and its respective seat and thus there is no interference with the free flow of air through the compartment 26 and out through the outlets 36 to the brake cylinders 18 (FIG. 1). On the other hand, it will be noted at this point that when the diaphragm is in its normal position (as shown in FIG. 3) the central portion thereof is disposed relatively close to the seat 35 so that only a very slight movement toward the seat is necessary to seat the central portion against the seat.

After the first surge of air through the compartment 26, which causes application of the brakes, the continued application of pressure to the brakes is maintained so long as the relay is energized. However, owing to the fact that the compartment 26 communicates through the tube 45 and the orifice 47 with the compartment 27 the pressure in the compartment 26 and the compartment 27 is soon equalized and the diaphragm 25 returns to its normal position wherein it is spaced closely adjacent to the seat 38.

The inclined form of the outer end 46 of the tube 45 serves to "shear off" air from the stream which flows rapidly past the end during the surge and air is thus forced through the tube and into the compartment 27. However, the small size of the orifice 47 prevents air from flowing so rapidly into the compartment, as to cause the diaphragm to again move outwardly and close against its seat.

The size of the orifice is selected so as to provided a throttling action on the air passing into the chamber which insures that the diaphragm is held in a position widely spaced from its seat for a sufficient time for the brake to be set. That is to say, the diaphragm is prevented from moving outwardly any appreciable distance until sufficient air under pressure has flowed through the valve to fill the brake cylinder and build up sufficient pressure to set the brake. The tube and orifice permit air to flow into the compensating compartment 27 so that after the brake has been set, the pressures in the outer compartment and the intermediate compartment are equalized and the diaphragm returns to its normal position.

When the relay 9 is operated to release the air pressure on the brakes and thereby release the brakes a reverse flow of air occurs through the outlet 36, the compartment 26 and the inlet 35. This surge of air causes the diaphragm 25 to be displaced inwardly and away from its seat 38 so as to permit maximum flow of air through the compartment 26 and out through the inlets 35. This action is assisted by the aspirator effect of the air flowing past the outer end of the tube 45. In other words, the flow of air past the outer end of the tube 45 creates a reduction of pressure in the tube which reduces the pressure in the chamber 27 and aids in the movement of the diaphragm 25 inwardly and away from its respective seat.

It will be seen that when the braking pressure is released there is a reverse flow of air through the valve from the outlet 36 through the air flow compartment 26 and out through the inlet 35. Since the diaphragm 25 is located opposite and closely adjacent to the seat 38 and the inner end of the outlet, this creates some restriction to the reverse flow of air through the valve. When the reverse flow occurs the diaphragm 25 is moved away from the seat 38. However, in order for this to occur it is necessary that air be moved out of the compensating compartment 27 through the restricted orifice 47 and passage 46 which retards the flow of air out of the compensating compartment 27, and thus retards the movement of the diaphragm 25 away from the seat 38.

It has been noted that in some instances this action prevents the diaphragm from responding with sufficient rapidity to release the brakes as rapidly as is desired. In order to accelerate the release of the brakes the present invention contemplates the provision of a by-pass or vent which permits the flow of air reversely through the valve without the air being impeded by the diaphragm.

Accordingly, a vent passage 500 is provided leading from the inlet passage 36 intermediate its ends and opening directly into the air flow compartment 26. Preferably, the vent passage 500 is disposed in alignment with the inlet passage 35 so that there is a substantially direct flow of air from the outlet passage 36 to the inlet passage 35 when the braking pressure is released. It will be understood that such flow is in addition to the flow of air through the inner end of the outlet passage 36 and into the air flow chamber 26 at the portion thereof opposite the central portion of the diaphragm 25.

In order to prevent the direct flow of air from the air flow compartment 26 into the outlet passage 36 through the vent passage 500 when braking pressure is applied, a one way check valve 501 is provided in the vent passage 500. This check valve permits relatively a free flow of air therethrough in a direction from the outlet passage 36 to the air flow compartment 26 but prevents any flow in the opposite direction. The check valve preferably includes a housing 502 of tubular form which is secured as by threading in the vent passage 500. The valve housing 502 has an inner and smaller bore 503 and an outer and larger bore 504 with a tapered valve seat 505 therebetween. Slidably disposed in the housing 502 is a movable valve element 506 having a cylindrical body portion 507 spaced from the bore 504 and a tapered nose portion 508 adapted to seat against the valve seat 505 to close the valve when the valve element 506 is in its innermost position, as shown in FIG. 3. Just outwardly of the tapered nose portion the valve element 506 is formed with a peripheral groove 509 in which is disposed an O-ring adapted to seat against the valve seat in sealing relation therewith when the valve element 506 is in closed position. The body portion 507 of the valve element 506 is formed with a slot 510 which receives a retaining pin 511 extending through the valve housing 502 and secured in the side walls thereof as a press fit. The slot 510 is of sufficient depth to permit the valve element 506 to slide freely in the housing 502 between closed position, as shown, and an open position away from the seat 505. The pin, however, prevents the valve member 506 from being dislodged from the valve housing 502.

It will be seen that when braking pressure is applied to the valve, air flows into the valve housing through the inlet passage 35, thence through the compartment 26 and out through the outlet passage 36. However, owing to the action of the check valve 501 air cannot flow through the vent passage 500. Thus the diaphragm 25 is forced away from the seat to allow relatively free flow of air through the valve casing, as above described. On the other hand, when braking pressure is released air can flow from the inlet passage 36 not only through the seat 38 but also through the vent passage 500, the valve element 506 being moved to open position by the air pressure thereon to permit such flow to occur.

It will be seen that where, as in the preferred form of the invention, the vent passage 500 is disposed in alignment with and relatively close to the inlet passage 35 there will be a minimum interference with the reverse flow of air through the valve.

A second embodiment of the invention is shown in FIG. 6. This valve comprises a double valve which includes essentially two single valves such as shown in FIG. 3 arranged back-to-back and secured together in a single assembly.

The valve of FIG. 6 includes two casing halves 21 each with its associated parts as shown and described in connection with the embodiment of FIGS. 1 to 4, except that the details of the alarms are omitted for simplicity, it being understood that they are the same as shown in FIG. 3. The casing halves are arranged back-to-back as shown with a divider 90 interposed therebetween, both of the casing halves 21 and the divider being secured together by bolts 91 to form a unitary assembly.

The divider includes a rigid imperforate plate which may be formed of metal having a thickened rim portion 92 by which the divider is secured between the casing halves. The divider also includes a partition portion which defines with the diaphragms 25, the inner chambers 95. The valve shown in FIG. 5 is connected, for example, in a system such as shown in FIG. 1, with one casing half being connected to the lines 13 and 16 and the other half to the lines 14 and 17. Each half of the valve will then operate in a manner similar to that described in connection with the single valve shown in FIGS. 1 to 4 and described hereinabove.

The safety valve whether in the form of a pair of separately formed valves, such as shown in FIGS. 2 to 4, or a double valve such as shown in FIG. 5 operates generally similarly to protect the two lines connected thereto. It will be obvious that in systems which embody only a single air controlled device, as for example a single brake, it is necessary only to provide a single valve between the source of air pressure.

Reverting now to the operation of the valve in a system employing two compressed air controlled devices such as air brakes, in the event that the brakes are applied when one of the lines, for example the line 17, is ruptured, or the brake cylinder 19 has failed, air enters the chamber 26 connected to the lines 13 and 16 under line pressure, that is under the pressure induced by the pressure of the air in the reservoir 10 and the brake cylinder 18 is actuated. At the same time the pressure in the chamber 26 connected to the lines 14 and 17 is reduced, whereby the diaphragm 25 is moved toward its seat 38 and closes the outlet 36 to halt the flow of air out of the casing 20 to line 17. Air flows through the tube 45 from the inlet 35 which is connected to the line 14 and into the compartment 27 to raise the pressure therein, which aids in moving the diaphragm 25 against its seat 38. When the diaphragm 25 closes the outlet 38, normal line pressure is restored in the chamber 26. The pressure in the chamber 27 also is normal line pressure. The area of the diaphragm 25 against which air in the chamber 27 is applied tending to urge the diaphragm against the seat 38 is greater by the extent of the overall area of the seat than the area of the diaphragm against which air in the chamber 26 is applied tending to urge the diaphragm away from the seat. Consequently, there is a net force urging the diaphragm against its seat so long as line pressure is applied. The diaphragm remains against the seat and there is no loss of air through the line 17. This condition obtains so long as the relay is energized to supply braking air to the valve 15. When the relay is released the diaphragm 25 returns to its normal position. Since there is no pressure in the line 17, the diaphragm 25 is displaced inwardly to allow free return of air.

If the brakes are again applied, that is, if the relay 9 is again energized, the diaphragm 25 will move to closed position and again close the outlet 36 to prevent any loss of air and the brake cylinder 18 will again be energized. Thus, whenever the relay 9 is actuated to apply the brakes, the brake cylinder 18 will be actuated even though line 17 is ruptured or the brake cylinder 19 has failed.

If at a time that the line 17 is ruptured or the cylinder 19 has failed the line 16 should rupture or the cylinder 18 fail, the reduction in pressure in the chamber 26 connected to the line 16 causes the diaphragm 25 to move into contact with the seat 38 and seal the chamber 26 connected thereto so that there is no loss of pressure in the system. The higher pressure then present in the chamber 27 also aids in moving the diaphragm 26 toward the seat 38. When the diaphragm 25 is against its seat 38 the air pressure needed to maintain braking pressure on the remaining brakes and in chamber 26 will keep the valve closed by means of pressure differential.

If the brakes are applied at a time when both of the brake lines 16 and 17 are ruptured or the cylinders 18 and 19 have failed, the reduction of pressure in the chambers 26 of the two valves causes both of the diaphragms 25 to move outwardly into engagement with their respective seats 38 to close their outlets 36. This action is augmented by the fact that as air flows past the inclined openings 46 of the tubes 45, the air is "sheared off" and passes through the tubes and into the intermediate chambers 27 to increase the pressure therein and urge the diaphragms 25 outwardly.

The reduction of pressure in the chambers 26 and the increase in pressure in the chamber 27 causes both of the diaphragm 25 to be moved outwardly against their respective seats 38 and to close the outlets so that no air passes out of the housings 20 and the pressure in the system is maintained.

If the brakes are released at a time when both of the lines are ruptured or both the cylinders have failed, both diaphragms return to their normal positions. Since there is no pressure in either line, the diaphragms are not displaced inwardly. When the brakes are again applied, the diaphragms close both outlets and prevent loss of air from the system.

If a line leading from either outlet should break or the cylinder should fail at a time when the brakes are applied, or the brakes should be applied at a time when a brake line is broken or failed, the corresponding signal will operate to notify the operator of such condition. If either such condition occurs, the pressure in the outlet is lower than the pressure in the chamber. Thus, the diaphragm 210 is forced outwardly and urges the contactor 203 against the head of the contactor 200. This completes a circuit through the signal lamp 201 to activate the signal. When the pressures in the outlet 211 and the chamber 26 are equalized, the signal device is de-energized.

In addition to halting the air flow through the valve when the line is ruptured or develops a large leak, the valve also is operative to halt the flow in the event of a small or slow leak in the line beyond the valve and thus the operator is warned of such slow leak. In this event air flows through the air flow passage from the inlet to the outlet in the usual manner when braking pressure is applied. However, after the initial rapid flow of air through the valve, and brake cylinder or booster is filled, the air continues to flow slowly through the air flow compartment. Owing to the differential in pressure over the tube leading to the compensating compartment, air continues to flow into the compensating compartment and the pressure in the latter is increased over the pressure in the air flow compartment and the diaphragm is moved to closed position.

The rate of closing of the diaphragm upon the occurrence of a rupture in the line can be adjustably controlled by the design of the "sensing" tube 45 and especially by the size of the "sensing" orifice 47. The larger the orifice the more rapidly is the pressure in the compensating compartment built up and the more rapidly the diaphragm closes in the event of a leak and vice versa. Likewise the closing of this valve upon a slow leak can be adjusted by selecting the size of the orifice so that it will close whenever the rate of air flow due to leakage exceeds a selected value.

Under normal conditions the diaphragm is moved away from the seat by the initial flow of air through the air flow compartment, thereby permitting free flow of air through the air flow passage upon the initial actuation of the relay. Under normal conditions, the diaphragm returns to its normal position spaced from the seat when the flow of air has halted.

When the relay is operated to release the air actuated device, such as the brakes, a reverse flow of air occurs through the air flow passage, and the diaphragm is displaced inwardly and away from its seat so as to permit greater flow of air through the air flow passage. The movement of the diaphragm away from its seat forces the air out of the compensating chamber. The vent passage permits a still greater reverse flow of air so that the brakes are released with great rapidity.

In the event that the relay is actuated when the connected line is ruptured, or has a large leak, the continued flow of air through the air flow passage causes air to flow into the compensating compartment through the restricted passage by reason of the pressure differential between the air at the entrance to the restricted passage and air in the air flow compartment above explained. Thus the pressure of air in the compensating compartment is increased so that it becomes greater than the pressure of air in the air flow compartment, and the diaphragm is urged outwardly against its seat. Thus the outlet is closed and the air flow halted.

Owing to the fact that when the diaphragm is closed there is a substantially greater area exposed to line pressure on the side of the compensating compartment than the area of the diaphragm on its other side, there is therefore a net force tending to maintain the diaphragm in closed position so long as line pressure is applied. When the relay is released, the air pressure is removed and the diaphragm, due to its resiliency, is returned to its normal position spaced from its seat.

Should there be a slow leak in the line and the brakes applied for an extended period, this would result in a loss of air. In this event, air will continue to flow through the air flow passage after the connected device is operated and, owing to the pressure differentials above explained, air will enter the compensating compartment and move the diaphragm toward closed position. As above explained, the operation of the diaphragm to close the outlet upon a slow leak is adjustably controlled by selecting the size of the restricted passage so that the diaphragm may be made to close upon any rate of flow of air caused by a slow leak. That is to say the larger the restricted passage, the more readily will the diaphragm be closed upon the existence of a slow leak.

It will be understood that the check valve is so designed that it will always be moved to closed position whenever there is any appreciable pressure drop thereacross in a closing direction. Thus the valve will close in the event of a slow leak and hence the diaphragm will close against its seat as above described.

In the foregoing description the passage into the valve casing which is connected to the source of air under pressure is designated for convenience as the "inlet" and the passage into the valve casing which is connected to the device to be operated, such as a brake cylinder or booster is designated as this "outlet." It will be understood that the foregoing terms describe the functions of these elements during the flow of air from the source to the operated device but when the relay is operated to release the air pressure in this device the air will flow through the casing in the opposite direction, that is in through the "outlet" and out through the "inlet."

I claim:
1. In a pressurizable fluid system, the combination of a casing having a chamber therein,
  a flexible diaphragm in said casing dividing said chamber into a fluid flow compartment and a compensating compartment,
  said casing having a fluid inlet passage and a fluid outlet passage extending therethrough and opening into said fluid flow compartment,
  a valve seat surrounding said outlet passage at the inner end thereof within said casing,
  said diaphragm being positioned opposite to said seat and normally spaced therefrom and movable against said seat to close said outlet,
  means defining a restricted passageway connecting said compensating compartment to said fluid flow compartment in proximity to said inlet passage, and
  check valve means by-passing said valve seat and operatively aligned with said inlet passage to direct fluid directly into said inlet passageway when the pressure downstream of said seat exceeds the pressure in said fluid flow compartment.
2. The combination set forth in claim 1 wherein
  said outlet is provided in a tubular member extending into said fluid flow compartment in a direction transverse to said inlet, and
  said check valve means is mounted over an aperture in the side of said tubular member facing toward said inlet.
3. The combination set forth in claim 2 wherein
  said restricted passageway is provided in a tube extending laterally into said inlet and having an open- ing therein directed toward the direction of fluid flow through said inlet into said flow chamber.

References Cited in the file of this patent

UNITED STATES PATENTS

| | | |
|---|---|---|
| 1,583,834 | Humphrey | May 11, 1926 |
| 2,103,349 | Conant et al. | Dec. 28, 1937 |
| 2,490,511 | Courtot | Dec. 6, 1949 |
| 2,603,235 | Kirkham | July 15, 1952 |
| 2,624,176 | Osborne | Jan. 6, 1953 |
| 2,826,212 | Cruse | Mar. 11, 1958 |
| 2,847,258 | Burdick | Aug. 12, 1958 |
| 2,992,652 | Fellberg | July 18, 1961 |
| 3,099,997 | Kroffke | Aug. 6, 1963 |

FOREIGN PATENTS

| | | |
|---|---|---|
| 1,115,245 | France | Dec. 26, 1955 |